US008355945B1

(12) United States Patent
Lall et al.

(10) Patent No.: US 8,355,945 B1
(45) Date of Patent: Jan. 15, 2013

(54) IDENTIFYING AND RANKING HIGH-IMPACT CHURN SECTORS

(75) Inventors: Abhishek Lall, Manhattan, KS (US); Cheryl Nichols, Raymore, MO (US); Syed Ubaid Ahmed, Overland Park, KS (US); Feng Xie, Leawood, KS (US); Jorge Toledo Climaco, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 767 days.

(21) Appl. No.: 12/463,621

(22) Filed: May 11, 2009

(51) Int. Cl.
*G06Q 10/00* (2006.01)
*G06Q 40/00* (2006.01)

(52) U.S. Cl. .................. 705/7.31; 705/7.29; 705/7.32; 705/7.33; 705/7.37

(58) Field of Classification Search ......... 705/7.11–7.42
See application file for complete search history.

(56) References Cited

U.S. PATENT DOCUMENTS

| | | | | |
|---|---|---|---|---|
| 6,049,599 | A * | 4/2000 | McCausland et al. | 379/111 |
| 6,301,471 | B1 * | 10/2001 | Dahm et al. | 455/405 |
| 2002/0069037 | A1 * | 6/2002 | Hendrickson et al. | 702/186 |
| 2003/0190015 | A1 * | 10/2003 | McCulley et al. | 379/9 |
| 2005/0135313 | A1 * | 6/2005 | Gandhi et al. | 370/335 |
| 2005/0159996 | A1 * | 7/2005 | Lazarus et al. | 705/10 |
| 2006/0007870 | A1 * | 1/2006 | Roskowski et al. | 370/252 |
| 2007/0116009 | A1 * | 5/2007 | Kangru et al. | 370/395.21 |
| 2007/0243881 | A1 * | 10/2007 | Roskowski | 455/456.1 |
| 2008/0046306 | A1 * | 2/2008 | Egner et al. | 705/10 |
| 2008/0167934 | A1 * | 7/2008 | Rani et al. | 705/9 |
| 2008/0200176 | A1 * | 8/2008 | Hutcheson et al. | 455/446 |
| 2009/0318131 | A1 * | 12/2009 | Aaron | 455/423 |
| 2010/0017247 | A1 * | 1/2010 | Liu et al. | 705/8 |
| 2010/0246544 | A1 * | 9/2010 | Brisebois et al. | 370/338 |

OTHER PUBLICATIONS

Neslin et al. "Defection Detection, Improving Predictive Accuracy of Customer Churn Models" (2004) Working Paper, Teradata Center at Duke University.*
Mozer et al. "Predicting Subscriber Dissatisfaction and Improving Retention in the Wireless Telecommunications Industry" (2000) IEEE Transactions on Neural Networks, Special issue on Data Mining on Knowledge REpresentation.*
Das et al. "An Econometric Model for Resource Management in Competitive Wireless Data Networks" (2004) IEEE Network Nov./Dec. 2004.*

* cited by examiner

*Primary Examiner* — Lynda Jasmin
*Assistant Examiner* — Sujay Koneru

(57) ABSTRACT

An embodiment of the invention is directed toward identifying a number of high-ranking sectors requiring additional communication resources in a network composed of a number of sectors. A set of wireless-service subscribers that have churned are identified. Various sector profile data is captured for sectors serving the churners. The sectors are ranked based on the sector profile data that is collected. A number of high-ranking sectors are identified, based on the ranking.

16 Claims, 5 Drawing Sheets

IDENTIFYING AND RANKING HIGH-IMPACT CHURN SECTORS

SUMMARY

This Summary is generally provided to introduce the reader to one or more select concepts described below in the Detailed Description in a simplified form. This Summary is not intended to identify the invention or even key features, which is the purview of claims below, but is provided to be patent-related regulation requirements.

One embodiment of the invention includes a method of identifying high-ranking sectors in a network made up of a plurality of sectors. A set of wireless-service subscribers that have churned are identified. Various sector profile data is captured for sectors serving the churners. The sectors are ranked based on the sector profile data that is collected. A number of high-ranking sectors are identified, based on the ranking.

BRIEF DESCRIPTION OF THE DRAWING

Illustrative embodiments of the present invention are described in detail below with reference to the attached drawing figures, and wherein.

DETAILED DESCRIPTION

Figure 1:
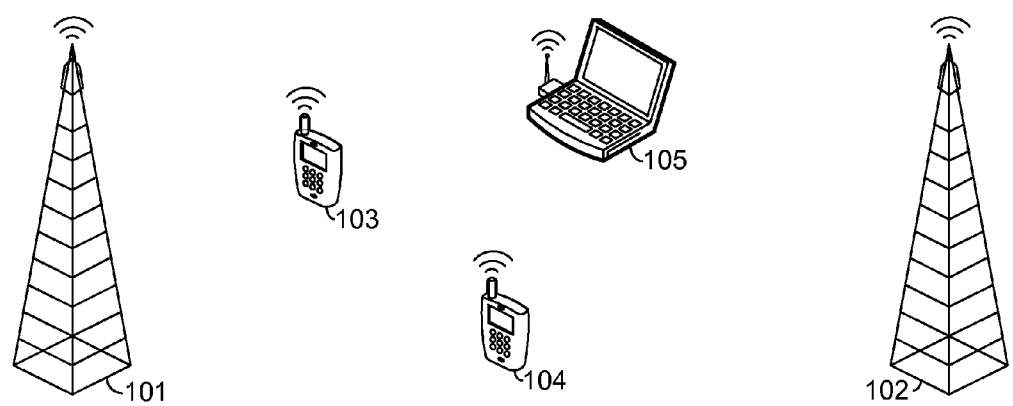
FIG. 1 is block diagram of an exemplary network suitable for practicing embodiments of the inventions.

The subject matter of the present invention is described with specificity to meet statutory requirements. However, the description itself is not intended to define the scope of the claims. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention provide a way to identify sectors that require additional communication resources or optimization changes in a wireless network composed of a plurality of sectors serving multiple wireless-service subscribers. Wireless-service subscribers faced with a network having a shortage of resources or performance issues may be more likely to switch from their current service provider to some other service provider. Wireless-service subscribers leaving their current service provider ("churners") could be minimized by identifying which sectors are likely to produce churners and adding additional communications resources or making performance improvements to those sectors.

There are a number of ways in which sectors that are likely to produce churners could be identified utilizing our technology. Customer profile data could be used to attempt to predict sectors that may produce churners. For example, the credit class of the majority of the wireless-service subscribers within a particular sector may impact the probability that the sector will produce churners. As another example, the percentage of wireless-service subscribers that are classified as sub-prime wireless-service subscribers may impact the probability that a sector will produce a higher number of churners.

Per-call customer data could also be used to predict sectors that may produce churners. By way of example, the final classes of calls may impact the probability that a sector will produce churners. Such final classes can indicate quality information about a call. For example a call final class may indicate that the call was blocked due to lack of communication resources, that the call was dropped, due to signal fade, or that the call was successful. There are many other potential call final class categorizations that are possible.

Time-per-call data could also be used to predicate the probability that a sector will produce churners. There are a number of ways to track time per call utilizing our technology, for example, minutes of use (e.g., Erlangs). In addition to per-call time-based data, averages for a sector over a period of time such as a month or a year could be used.

Time-based data and per-call data can be referred to generally as network usage data. Such data can be used either in statistical form, such as the percentage of total calls that are in a particular call final class, or in per-day or per-customer form, such as the average number of minutes per wireless-service subscriber for a particular sector.

Customer experience data could also be used to predict sectors that may produce churners. For example, the number of tickets filed with a customer service center could be used as a metric for customer experience. There are many other possible ways to collect customer experience data, including conducting periodic surveys.

Network configuration and terrain data could also be used to predict sectors that are likely to produce churners. Network configuration data can include information such as the number of carriers per sector and the number of channels used. Terrain data can include an indication of the type of terrain in the region covered by a particular sector. Types of terrain can indicate a clutter type. For example, types of terrain could include residential, commercial, urban, rural, airport, paved area, forested-dense vegetation, open, grass-agriculture, marsh-wetland, and water.

Various data could be combined using another of different algorithms to determine a probability that a particular sector is likely to produce churners. According to an embodiment of the invention, a neural network could be used to determine the probabilities that a sector would be among a top threshold percentile of churning sectors, where a churning sector is a sector that produces churners. Neural networks provide non-linear statistical data modeling and can be used to find patterns in large, complex data sets. Neural networks can consist of nodes and cost functions that can define weights for each of a number of factors that determine a result.

According to an embodiment of the invention, the probability that a sector is in a top fifth percentile of churning sectors could be determined using a one-step neural network on a number of factors. For example, the factors could be the following:

| | |
|---|---|
| Erlangs_prime (EP) | The total number of Erlangs used on a sector by the prime wireless-service subscribers. An Erlang can be one minute of use divided by sixty. |
| Erlangs_subprime (ES) | The total number of Erlangs used on a sector by the sub-prime wireless-service subscribers. |
| Attempts_prime (AP) | The total call setup attempts on a sector by all the prime wireless-service subscribers. |
| Failures_subprime (FS) | The total access failures on a sector for all the sub-prime wireless-service subscribers. Access failures can include connection failures and setup failures due to loss of radio signal. |
| Drops_subprime (DS) | The total number of dropped calls on a sector for sub-prime wireless-service subscribers. A dropped call can include calls that cannot be successfully completed once it has been connected in a wireless coverage area. |
| Terrain | The terrain type, where the terrain type could be Commercial (TC), Residential (TR), Urban (TU), or Rural. |

According to an embodiment of the invention, the above factors could be combined using a one-hop neural network described by the following equation:

$$P = 1/1 + e^{-(-5.32 + 0.02EP + 0.02ES - 0.0009AP + 0.11FS - 0.03DS + 1.62TC + 0.56TR + 1.08TU)},$$

where P is the probability that the given sector is among the top 5 percentile churning sectors. Specifically, according to an embodiment of the invention, if P>0.5, the sector can be in the top 5 percentile of churning sectors. Rural is not represented in the equation because if the components related to Commercial, Residential, and Urban are all zero, then the result is Rural. The numbers preceding the various factors in the equation represent the weights associated with each.

The statistics used to determine a sector is likely to produce churners could be collected for all sectors in which a wireless-service subscriber has churned in the past. A history of the sector involved could be captured for a time period before the wireless-service subscriber churned. For example, history of the six-month period before the churn occurred could be used. This data could be stored in databases by the wireless-service provider.

Sectors could be assigned reasons likely for causing churn based on the factors used to determine that the sector is likely to produce churners. By way of example, if the component measuring the number of dropped calls was primarily responsible for determining that the sector is likely to produce churners, then a reason statement indicating that the sector produces too many dropped calls could be appended to the sector ranking that indicates it as a likely producer of churners.

An embodiment of the invention is directed towards computer-readable media having computer-executable instructions embodied thereon that, when executed, enable a computing device to perform a method of identifying a number of high-ranking sectors in a network composed of sectors. A set of wireless service subscribers that have churned during a period of time is identified. Customer profile data, usage data, and terrain data related to the set of churners is captured for a period of time representing a time before the churners had churned. The sectors are ranked, based on the customer profile data, usage data, and terrain data. High-ranking sectors that required additional communication resources or optimization changes are identified, based on the ranking. Sectors may be high ranking due to a lack of resources. Sectors may also be high ranking due to other performance issues.

Another embodiment of the invention is directed towards computer-readable media having computer-executable instructions embodied thereon that, when executed, enable a computing device to perform a method of identifying a number of high-ranking sectors in a network of sectors. Customer profile data, usage data, and terrain data is captured for each of the sectors. A probability that each sector is in a top percentile of churn-producing sectors is determined, based on the captured data. A set of sectors with a probability of being in a top percentile of churn-producing sectors greater than a threshold is identified as a set of high-ranking sectors requiring additional communication resources or optimization changes.

A further embodiment of the invention is directed towards computer-readable media having computer-executable instructions embodied thereon that, when executed, enable a computing device to perform a method of identifying a number of high-ranking sectors in a network of sectors. A set of wireless service subscribers that have churned during a period of time is identified. A number of serving sectors that served the churners is determined. Customer profile data, usage data, and terrain data is loaded from databases. The sectors are ranked, based on the customer profile data, usage data, and terrain data. High-ranking sectors that required additional communication resources or optimization changes are identified, based on the ranking. Reasons for each high-ranking sector being ranked is determined. The reasons are included with the rankings. Additional resources are provided to the sectors identified as high-ranking sectors.

Referring initially to FIG. 1 in particular, an exemplary operating environment for implementing the present invention is shown. A wireless network including a number of basestations or towers (e.g., tower 101 and tower 102) provides wireless-service support for a plurality of mobile computing devices, including laptops 105 and handheld devices 103 and 104, such as PDAs and mobile phones. As mobile computing devices 103-105 move through the wireless network, they can use basestations 101, 102 as points of attachment to a wide area network that can include a connection to the Internet. The basestations or towers 101, 102 can be positioned throughout a geographical space in such a way as to provide wireless-signal coverage across a particular region.

Figure 2:
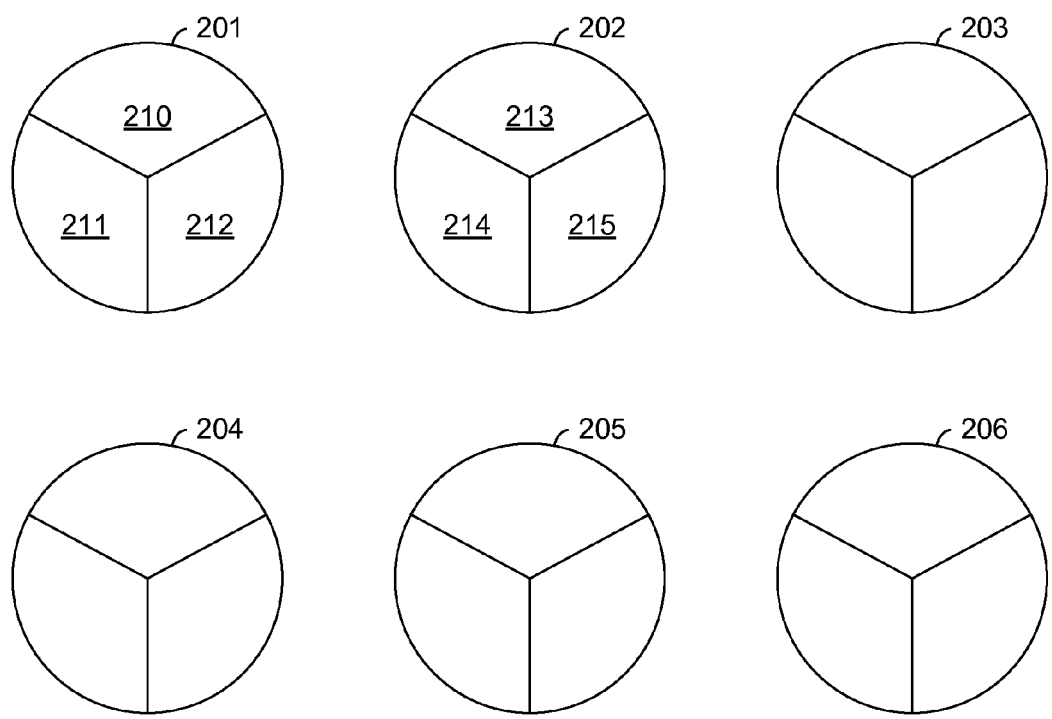
FIG. 2 is a block diagram of a network made up of multiple sectors suitable for practicing embodiments of the invention.

Turning now to FIG. 2, an exemplary basestation layout is shown. Basestations can be placed in such a way to cover an entire region. For example, basestations 201-206 could be positioned in a grid. There are many other suitable ways to position basestations 201-206 to maximize coverage. The coverage areas of the basestations 201-206 should overlap to ensure there are no gaps in the coverage. Each basestation can define a sector in the wireless network. Any mobile computing device using a particular basestation can be said to be within its sector. Additionally, each basestation 201-206 can have a plurality of sectors associate with it. For example, basestation 201 has three sectors 210-212 and basestation 202 has three sectors 213-215. Multiple carriers allow each basestation 201-206 to provide network connectivity to a larger number of mobile computing devices.

Figure 3:
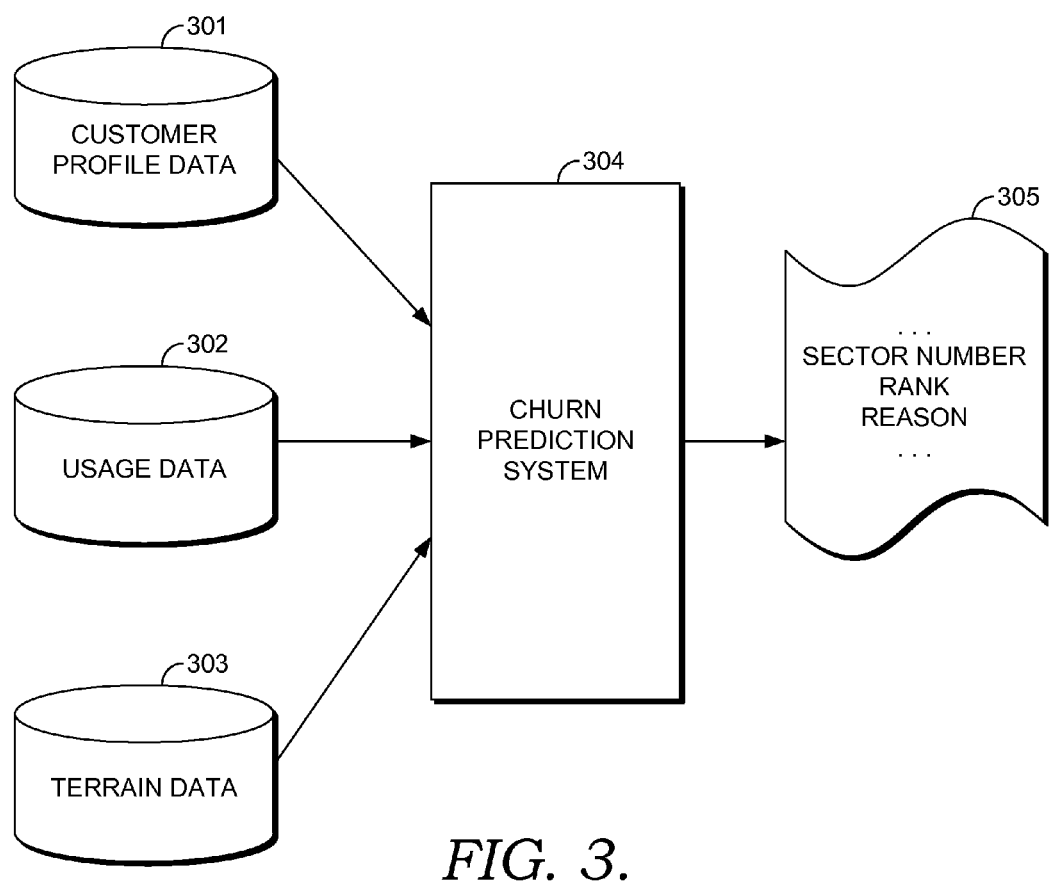
FIG. 3 is a block diagram depicting a number of components for ranking sectors, in accordance with embodiments of the invention.

Computing devices attached to each sector can collect various data related to mobile computing device activity. Such data could be stored in databases. FIG. 3 is a block diagram depicting various components according to an embodiment of the invention. A number of databases 301-303 are used to store information related to the sector. According to an embodiment of the invention, all information related to a single sector could be stored in a single database. According to another embodiment of the invention, a single database could be used to store data related to multiple sectors. There are many ways in which data related to sectors could be stored in databases in accordance with various embodiments of the invention. By way of example, a Customer Profile Data database 301 could be used to store customer profile data for all wireless-service subscribers using a particular wireless-service provider. A Usage Data database 302 could be used to store usage data from all sectors in a wireless network composed of sectors. A Terrain Data database 303 could be used to store terrain data related to each sector in the wireless network.

According to an embodiment of the invention, the data contained in the various databases 301-303 could be used as input to a churn prediction system 304. The churn prediction system 304 contain a mechanism for determining which sectors are likely to produce churners. For example, the churn prediction system 304 could utilize a neural network algorithm to calculate a probability that a sector will be in a top percentile of churn producing sectors. The top percentile could be the top fifth percentile.

A ranking 305 could be produced, in accordance with an embodiment of the invention. For example, the ranking 305 could be a list of sectors with a rank based on the probability determined by the churn prediction system 304. A reason for the ranking could also be included for each sector. By way of example, the primary factor influencing the rank could be included with the rank. A primary factor could be that there were a large number of drops. There are many ways that a primary factor could be determined and used as a reason for a ranking. According to some embodiments of the invention, the ranking 305 could be used to determine sectors that require additional resources. These sectors could have additional resources added to attempt to prevent the sectors from producing churners.

Figure 4:
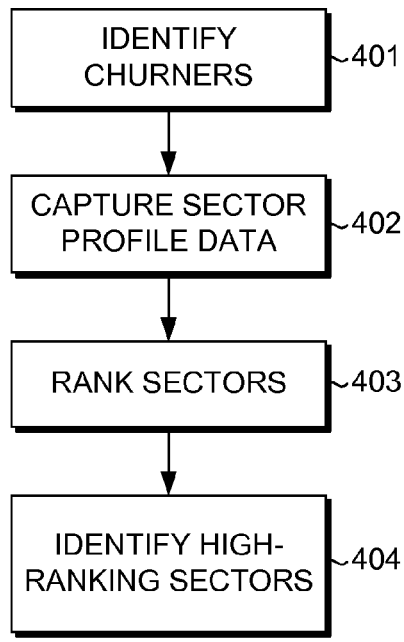
FIG. 4 is a flow diagram depicting a method of identifying high-ranking sectors that require additional communications resources, in accordance with embodiments of the invention.

Turning now to FIG. 4, a flow diagram depicting a method of identifying high-ranking sectors is given. A set of wireless-service subscribers that have churned within a given time period are identified, as shown at block 401. There are many ways in which the set of churners could be identified. By way of example, a database could be used to store customer profile information, including which previous customers have churned. The given time period could be of different lengths. For example, wireless-service subscribers that have churned within the last six months could be identified.

Sector profile data, including customer profile data, usage data, and terrain data related to the set of churners for a period of time preceding the churning is captured, as shown at block 402. By way of example, the sector profile data could be collected for the three months prior to the time when the customers churned. There are many other ways in which the time period for which data is captured could be chosen in accordance with embodiments of the invention. There are many types of customer profile data that can be captured. By way of example, the customer profile data may include customer prime and subprime classification data. There are many types of usage data that could be captured. According to an embodiment of the invention, the usage data includes minutes of use, call attempts, access failures, and blocked calls. Terrain data, according to an embodiment, can include a clutter type for each sector. By way of example, clutter types could include residential, commercial, urban, and rural.

The sectors are ranked, based on the captured sector profile data, as shown at block 403. For example, a regression model could be used to rank the sectors based on the captured data. As another example, a neural network could be used to rank the sectors based on the captured data. According to some embodiments, reasons associated with each ranking are included with the rankings. For example, the reasons could include a high number of blocked calls and a high ratio of failed connection attempts. Sectors requiring additional resources are identified, based on the ranking, as shown at block 404. By way of example, any sector in the top fifth percentile of sectors likely to produce churners could be identified as sectors requiring additional resources.

Figure 5:
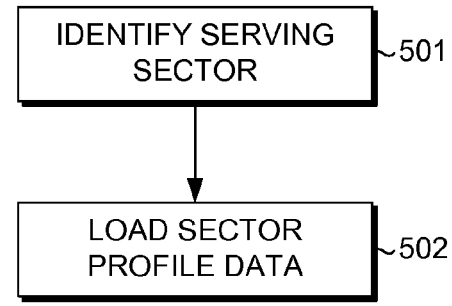
FIG. 5 is a flow diagram depicting a method of capturing sector profile data, in accordance with embodiments of the invention.

Turning now to FIG. 5, a flow diagram depicting a method of capturing sector profile data is given. Sectors serving identified churners are identified, as shown at block 501. By way of example, churners could be identified using databases containing wireless-service subscriber information. Sector profile data is loaded from databases storing a plurality of sector data, including customer profile data, usage data, and terrain data, for each identified sector, as shown at block 502.

Figure 6:
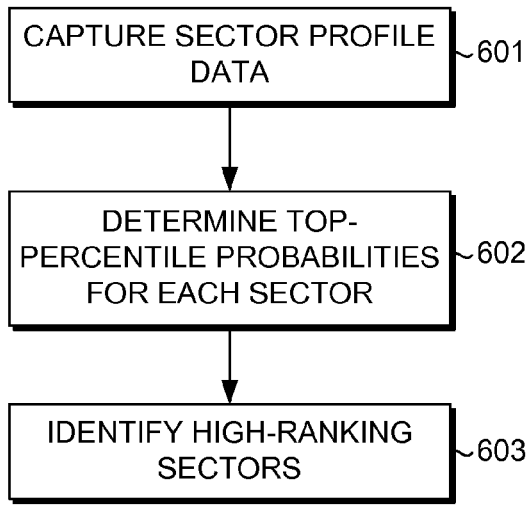
FIG. 6 is a flow diagram depicting a method of identifying high-ranking sectors that require additional communications resources, in accordance with embodiments of the invention.

Turning now to FIG. 6, a flow diagram depicting a method of identifying high-ranking sectors that require additional networking resources is given. For each of a plurality of sectors serving wireless-service subscribers, sector profile data is captured, as shown at block 601. By way of example, customer profile data, usage data, and terrain data could be loaded from databases containing sector profile data.

A probability that each sector is in a top percentile of sectors likely to cause wireless-service subscribers to churn is determined, based on the captured sector profile data, as shown at block 602. There are many ways the probabilities could be determined. According to an embodiment of the invention, a neural network could be used to determine the probabilities. The top percentile could be a top fifth percentile, in accordance with an embodiment of the invention. Other percentiles could be used to as a basis for the probability determination. According to some embodiments of the invention, reasons for the determined probability could be given with each probability.

High-ranking sectors are identified based on the probabilities determined, as shown at block 603. According to an embodiment of the invention, any sector with a probability of being in a top percentile greater than a threshold probability could be identified as a high-ranking sectors. By way of example, the threshold probability could be 0.5. According to an embodiment, reasons for each sector being determined to be high-ranking could be given. By way of example, a reason could include excessive dropped calls or excessive failed call attempts.

Figure 7:
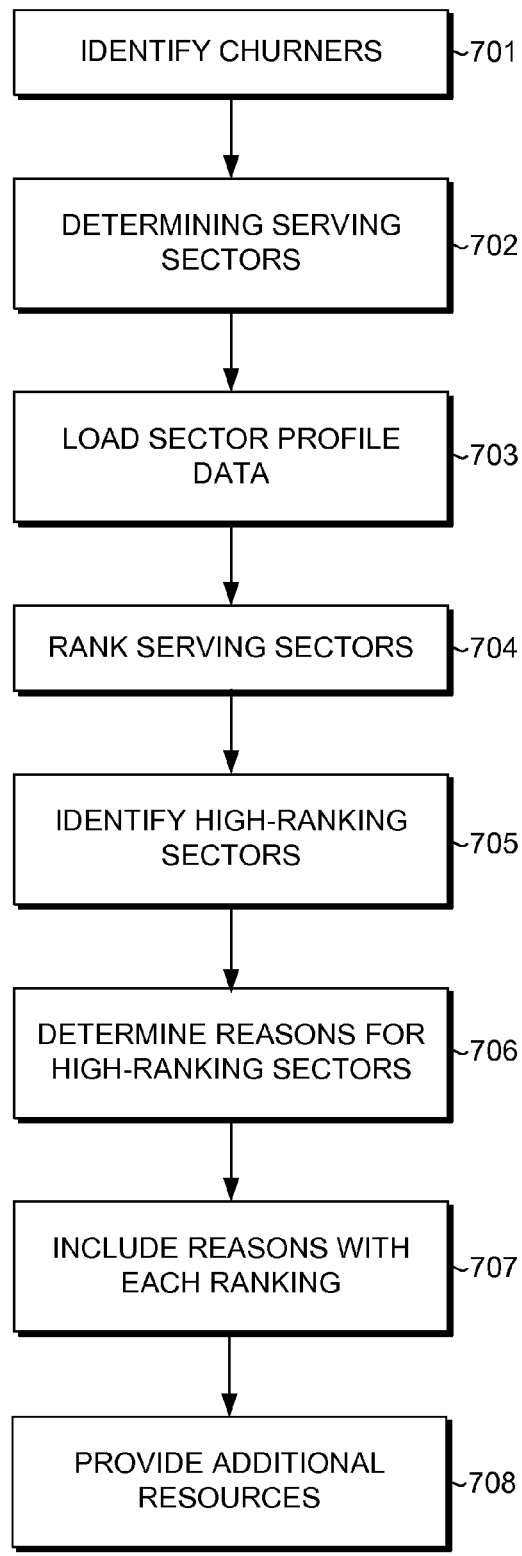
FIG. 7 is a flow diagram depicting a method of identifying high-ranking sectors that require additional communications resources, in accordance with embodiments of the invention.

Turning now to FIG. 7, a flow diagram depicting a method of identifying high-ranking sectors in a wireless network made up of multiple sectors is given. a number of wireless-service subscribers that have churned is identified, as shown at block 701, similar to block 401 of FIG. 4. A list of serving sectors that served the identified churners is determined, as shown at block 702. The list of serving sectors could be determined using historical data stored in databases. For example, the databases could contain usage logs matching wireless-service subscribers to sectors that served them over given periods of time.

Sector profile data is loaded, the profile data including customer profile data, usage data, and terrain data, as shown at block 703, similar to block 502 of FIG. 5. Sectors are ranked based on the sector profile data loaded, as shown at block 704, similar to block 403 of FIG. 4 and high-ranking sectors that require additional resources are identified, based on the ranking, as shown at block 705. Reasons for each sector having a particular ranking are determined, as shown at block 706 and the reasons are included with each ranking, as shown at block 707. Additional resources are provided to a number of the sectors identified as high-ranking sectors, as shown at block 708. According to an embodiment of the invention, additionally resources can be provided by adding additional carriers or channels to the sectors, or by performing optimization improvements to these high-ranking sectors.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description. As mentioned, embodiments of the present invention include a variety of features. Below is a partial listing of some of those embodiments and features:

The invention claimed is:

1. One or more non-transitory computer-readable media having computer-executable instructions embodied thereon that, when executed, enable a computing device to perform a method of identifying one or more high-ranking sectors that require additional communications resources in a wireless network that includes a plurality sectors serving multiple wireless-service subscribers, the method comprising:

identifying a set of churners that are wireless-service subscribers that have churned during a given period of time;

for each of the plurality of sectors, capturing by the computing device customer profile data, usage data, and terrain data related to the set of churners for a pre-churn time period that is a first period that precedes said given time period;

ranking by the computing device the plurality of sectors based on a probability of each sector to produce churners, wherein the probability of each sector to produce churners is based on the customer profile data, the usage data, and the terrain data for that sector, wherein ranking the plurality of sectors includes ranking the plurality of sectors based on the probability that each of the plurality of sectors is one of the top five percentile churning sectors;

determining one or more reasons for each of the plurality of sectors being ranked and including the one or more reasons with each ranking, wherein the one or more reasons include high ratio of blocked calls and a high ratio of failed connection attempts; and identifying by the computing device one or more high-ranking sectors that require additional communications resources based on the ranking.

2. The media of claim 1, wherein the period of time is about six months.

3. The media of claim 1, wherein the pre-churn time period is about three months.

4. The media of claim 1, wherein the profile data includes customer prime and subprime classification.

5. The media of claim 4, wherein usage data includes minutes of use, call attempts, access failures, and blocked calls.

6. The media of claim 5, wherein the terrain data includes a clutter type.

7. The media of claim 6, wherein the clutter type includes residential, commercial, urban, and rural.

8. The media of claim 1, wherein capturing by the computing device customer profile data, usage data, and terrain data comprises:

identifying one or more serving sectors that served the churners during the time period; and loading customer profile data, usage data, and terrain data from one or more databases storing information related to the one or more serving sectors.

9. The media of claim 1, wherein ranking the plurality of sectors includes using a neural network to rank the plurality of sectors based on the customer profile data, the usage data, and the terrain data.

10. One or more non-transitory computer-readable media having computer-executable instructions embodied thereon that, when executed, enable a computing device to perform a method of identifying one or more high-ranking sectors in a wireless network composed of a plurality of sectors serving multiple wireless-service subscribers that require additional communication resources, the method comprising:

capturing by the computing device customer profile data, usage data, and terrain data related to each of the plurality of sectors serving multiple wireless-service subscribers;

determining by the computing device a probability that each of the plurality of sectors is in a top five percentile of sectors that contain churners that are wireless-service subscribers that churn, based on the customer profile data, the usage data, and the terrain data, wherein the sectors are ranked based on the determined probability;

identifying a set of sectors of the plurality of sectors with a probability of being in the top five percentile greater than a threshold percentile as one or more high-ranking sectors requiring additional communication resources; and determining one or more reasons for each of the plurality of sectors being within the set of sectors, wherein the one or more reasons include high ratio of blocked calls and a high ratio of failed connection attempts, and including the one or more reasons with each sector.

11. The media of claim 10, wherein capturing customer profile data, usage data, and terrain data comprises:

identifying one or more serving sectors that served the churners during a time period; and loading customer profile data, usage data, and terrain data from one or more databases storing information related to the one or more serving sectors.

12. The media of claim 10, wherein determining the probability includes using a neural network to determine the probability based on the customer profile data, the usage data, and the terrain data.

13. The media of claim 10, wherein the top percentile is the top fifth percentile.

14. The media of claim 10, wherein the threshold probability is about 0.5.

15. One or more non-transitory computer-readable media having computer-executable instructions embodied thereon that, when executed, enable a computing device to perform a method of identifying one or more high-ranking sectors that require additional communications resources in a wireless network composed of a plurality sectors serving multiple wireless-service subscribers, the method comprising:

identifying churners that are wireless-service subscribers that have churned in a period of time;

determining a one or more serving sectors that served the churners during the time period;

loading customer profile data, usage data, and terrain data from one or more databases storing information related to the one or more serving sectors;

ranking the serving sectors based on a probability of each serving sector to produce churners, wherein the probability of each sector to produce churners is based on the customer profile data, the usage data, and the terrain data, wherein the ranking is proportional to the probability that each of the serving sectors is one of a top five percentile churning sectors;
identifying one or more high-ranking sectors that require additional communications resources based on the ranking;
determining one or more reasons for each high-ranking sector being ranked wherein the one or more reasons include high ratio of blocked calls and a high ratio of failed connection attempts;
including the one or more reasons with each ranking; and
providing additional resources to one or more of the one or more high-ranking sectors.

16. The media of claim 15, wherein ranking the serving sectors includes using a neural network to rank the sectors based on the customer profile data, the usage data, and the terrain data.

* * * * *